Feb. 13, 1934.   K. D. JONES ET AL   1,946,744
FILTER
Filed May 19, 1931
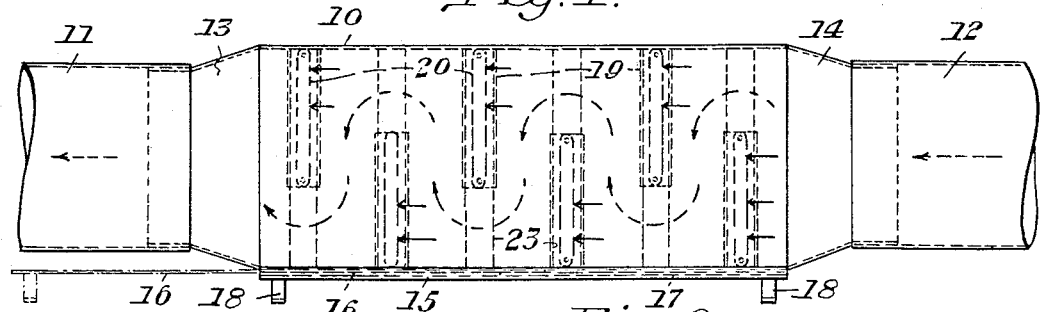
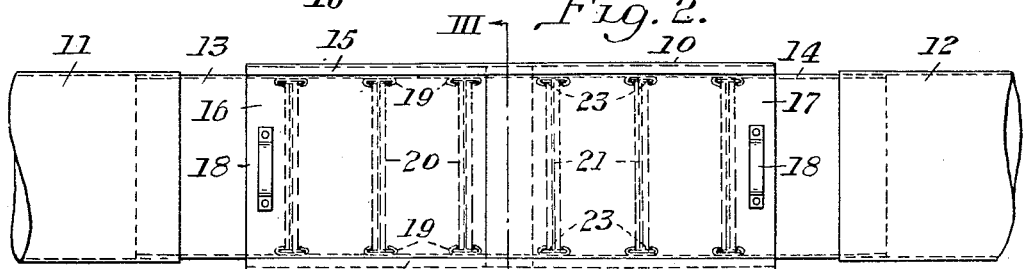
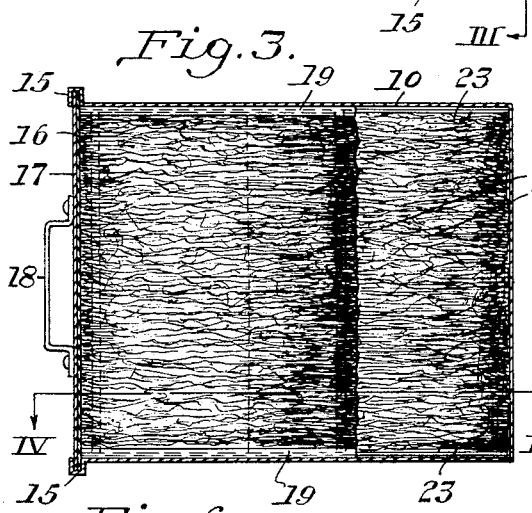
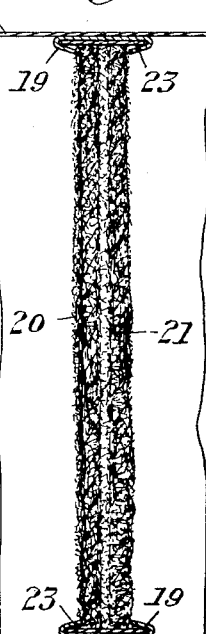
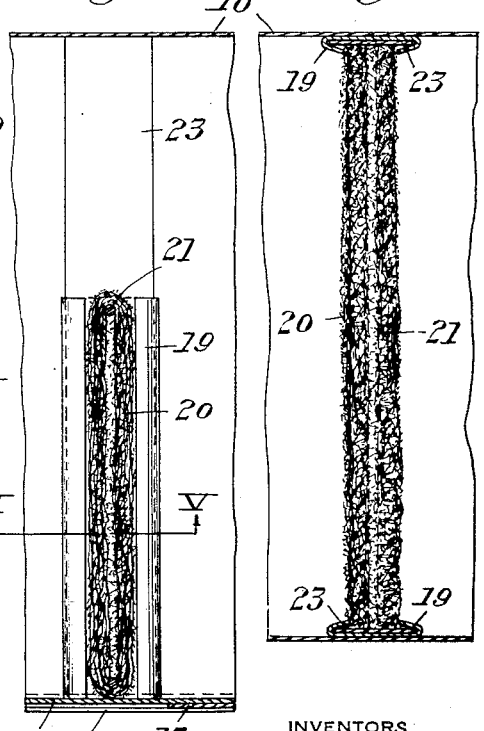
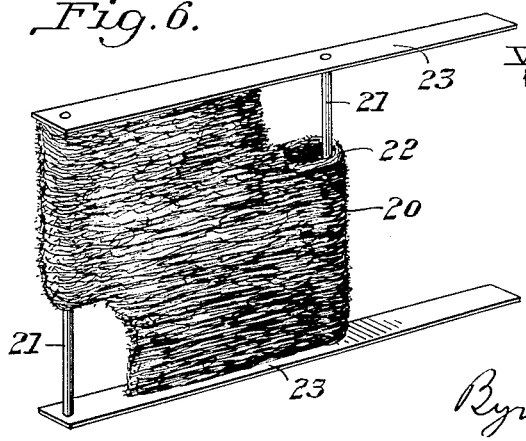
INVENTORS
Kenneth D. Jones &
William R. Thomas
by their attorneys
Byrnes, Stebbins, Parmelee & Blenko Patented Feb. 13, 1934

1,946,744

UNITED STATES PATENT OFFICE 1,946,744

FILTER

Kenneth D. Jones and William R. Thomas, Munhall, Pa.

Application May 19, 1931. Serial No. 538,440

2 Claims. (Cl. 183—49)

Our invention relates to filters and, in particular, to filters of the type for treating air, although it is not limited thereto and may also be applied to the treatment of liquids.

It is well known that, in warm air circulating systems, a considerable amount of dust and dirt is suspended in the circulating air. In domestic heating plants, this circulation of dust and dirt is very objectionable, and it is one of the objects of the present invention to provide means for removing suspended particles from warm air in domestic heating systems.

We are aware that certain proposals have been made heretofore toward an accomplishment of this object but, so far as we know, all of these proposals have been unsuccessful and have failed to afford a satisfactory solution for the problem of providing cleaned filtered air in domestic heating systems. Filters heretofore known, as far as we are aware, have been found to be generally ineffective and to require considerable care and maintenance. They are further objectionable on account of their comparatively high first cost.

We have invented a filtering apparatus, the chief application of which we believe to be the domestic heating system, although not limited thereto since it is also applicable to industrial systems, as well as public buildings, which is characterized by low cost of installation, ease of maintenance, as well as satisfactory and effective operation over a long and useful life. According to our invention, we provide a housing in each of the hot air supply conduits of a heating system. Within these housings, we dispose a plurality of filtering elements which are not as wide as the housing itself and extend alternately from opposite sides thereof. One wall of the housing is open for removal of the filter elements or baffles, and sliding doors are provided to close this opening when the device is in operation. The filtering elements themselves comprise metal frames slidably received in guide channels within the housing. Around the frames of the filtering elements we wind a loosely spun strand of metallic fiber, such as steel wool. By reason of the relative positions of successive filtering elements in the housing, a circuitous or serpentine path is provided from end to end thereof. Suitable reducers are provided for connecting the ends of the housing to the sections of a warm air supply conduit.

For a more complete understanding of the invention, reference is made to the accompanying drawing illustrating a present preferred embodiment of the invention.

In the drawing:

Figure 1 is a top plan view of the invention installed in a warm air supply conduit.

Figure 2 is a side elevational view,

Figure 3 is a transverse sectional view along the plane of line III—III of Figure 2.

Figure 4 is a partial sectional view taken on the line IV—IV of Figure 3,

Figure 5 is a partial sectional view taken along the line of V—V of Figure 4, and Figure 6 is a perspective view of one of the filtering elements, partly broken away.

Referring in detail to the drawing, the invention comprises a housing or casing 10 having open ends and a generally rectangular cross-section. The housing 10 is adapted to be connected to adjacent conduit sections 11 and 12 of a warm air supply conduit extending from a hot air furnace to the usual outlet, by means of reducers 13 and 14. The reducers are preferably soldered or otherwise connected to the housing 10 and have a sliding fit with the sections 11 and 12.

One of the side walls of the housing 10 is open. The top and bottom walls of the housing are provided with channels 15 slidably supporting door sections 16 and 17 which overlap adjacent the middle of the housing. Handles 18 facilitate sliding movement of the doors to expose the interior of the housing 10 for removal of the filtering elements to be presently described, or for cleaning the interior of the housing. The top and bottom walls of the housing are provided with transverse guide channels 19 soldered thereto. Filtering elements 20 comprise a frame 21 and a wrapping of loosely spun strands of metallic fiber 22. The frame 21 includes upper and lower flat strips 23 adapted to enter the guide channels 19.

As will be apparent from Figure 6, the strips 23 extend the full width of the housing 10. The filtering baffle formed by the wrapping of strands 22 of metallic fiber, is of less width than the housing 10. Adjacent elements 20 are preferably positioned within the guide channels 19 in opposite directions. In other words, the successive filtering elements extend alternately from opposite side walls of the housing, but terminate short of the other side thereof. As will be apparent from Figure 1, this arrangement of the filtering baffles defines a circuitous or serpentine path for air passing through the filter housing as indicated by the arrows.

When the invention is installed as shown in Figure 1, and warm air supplied thereto in the direction of the arrows, the filtering baffles 20 serve to filter out of the air all dust and dirt suspended therein. The baffles themselves are not at all impervious to air and offer but little resistance to the movement thereof. The passage of air through the filter is further facilitated by the provision of the serpentine path above referred to around the ends of the baffles. The obstruction to the free passage of air is thus reduced to a minimum.

The portion of the air which passes directly through one or more of the filter baffles is filtered directly. The fine metal fibres composing the strands 22, constitute an unusually effective filtering medium. The microscopic teeth or serrations on the metallic fibers or threads appear to provide lodging places for even the very finest suspended matter. That portion of the air which traverses the serpentine path is freed of suspended particles by the centrifugal effect produced by the turns in the path around the ends of the baffles. We thus combine the principle of direct filtration with centrifugal dust precipitation, and the result is a very efficient removal of all suspended matter from the air treated.

Since the baffles offer such a negligible obstruction to the flow of air therethrough or therearound, the invention is ideally suited for hot air systems of the natural draft type. It is equally well adapted for use in larger systems where a forced circulation of the warm air is employed.

The invention requires but little attention when in operation and can be readily cleaned. After it has been in use for a period of several weeks, it should be cleaned by withdrawing the sliding doors one at a time, removing the filtering baffles and the accumulations of dust and dirt which will be found deposited on the floor of the housing 10. The removal of accumulated dust can most readily be effected by means of a vacuum cleaner suction hose. The baffles themselves are easily freed of collected dust by shaking or rapping them sharply upon some solid structure. It is only when the filter is cleaned that the remarkable effectiveness thereof is fully demonstrated. Upon rapping the filtering baffles against a solid structure, it will be noted that the dust freed thereby is of the very finest and most impalpable character. In fact, it floats in the air like a cloud of smoke, thus proving conclusively that the device precludes passage to the warm air outlet of even the very smallest suspended particles. After one end of the filter housing has been cleaned, the operation can be repeated for the other end, after which the filter is again in condition for operation without attention for a period of several weeks.

The size and dimensions of the filter, will of course, be determined by the capacity of the conduit in which it is installed. The dimensions of the housing and the number and arrangement of the filtering baffles may be varied within wide limits to suit the requirements of any particular installation.

It will be apparent from the foregoing description that our invention, in addition to being a very effective filter for warm air supply conduits, is also characterized by a low cost of manufacture. We prefer to make the parts of sheet metal insofar as possible, and since there are no machining operations required, the device can readily be made in large quantities at a low unit cost. As previously pointed out, we contemplate the installation of one of the filters in each of the warm air outlet conduits from a furnace.

Although we have illustrated and described herein but a single present preferred embodiment of the invention, it will be obvious that many changes in the details of construction herein described may be made. Some of these have already been pointed out. Others will occur to those skilled in the art. As to such details and changes, however, the invention is not limited in anywise by the embodiment described and illustrated, but may be otherwise practiced within the scope of the appended claims without departing from the spirit of the invention.

We claim:

1. In a filter, a housing, sheet metal guide channels extending transversely of the housing, and filtering elements having sheet metal frame members adapted to enter said channels, said members being longer than the effective width of said elements.

2. In an air filter, a filter chamber of rectangular section having an open side fitted with a pair of sliding doors, channels secured to the top and bottom walls of said chamber and filter elements received therein comprising flat top and bottom strips for entering said channels, side rods connecting said strips, one rod being adjacent the ends of the strips, the other being intermediate the ends thereof, and a loose strand of steel wool wound around said rods forming a double filter mat.

KENNETH D. JONES.
WILLIAM R. THOMAS.